INVENTORS
Vincent A. Dekan
Richard C. Lundquist
BY

May 22, 1962

R. C. LUNDQUIST ET AL 3,035,822

TELESCOPIC ROTARY BORING HEAD

Filed Nov. 24, 1959

INVENTORS
Vincent A. Dekan
Richard C. Lundquist
BY

May 22, 1962
R. C. LUNDQUIST ET AL
3,035,822
TELESCOPIC ROTARY BORING HEAD
Filed Nov. 24, 1959
5 Sheets-Sheet 3
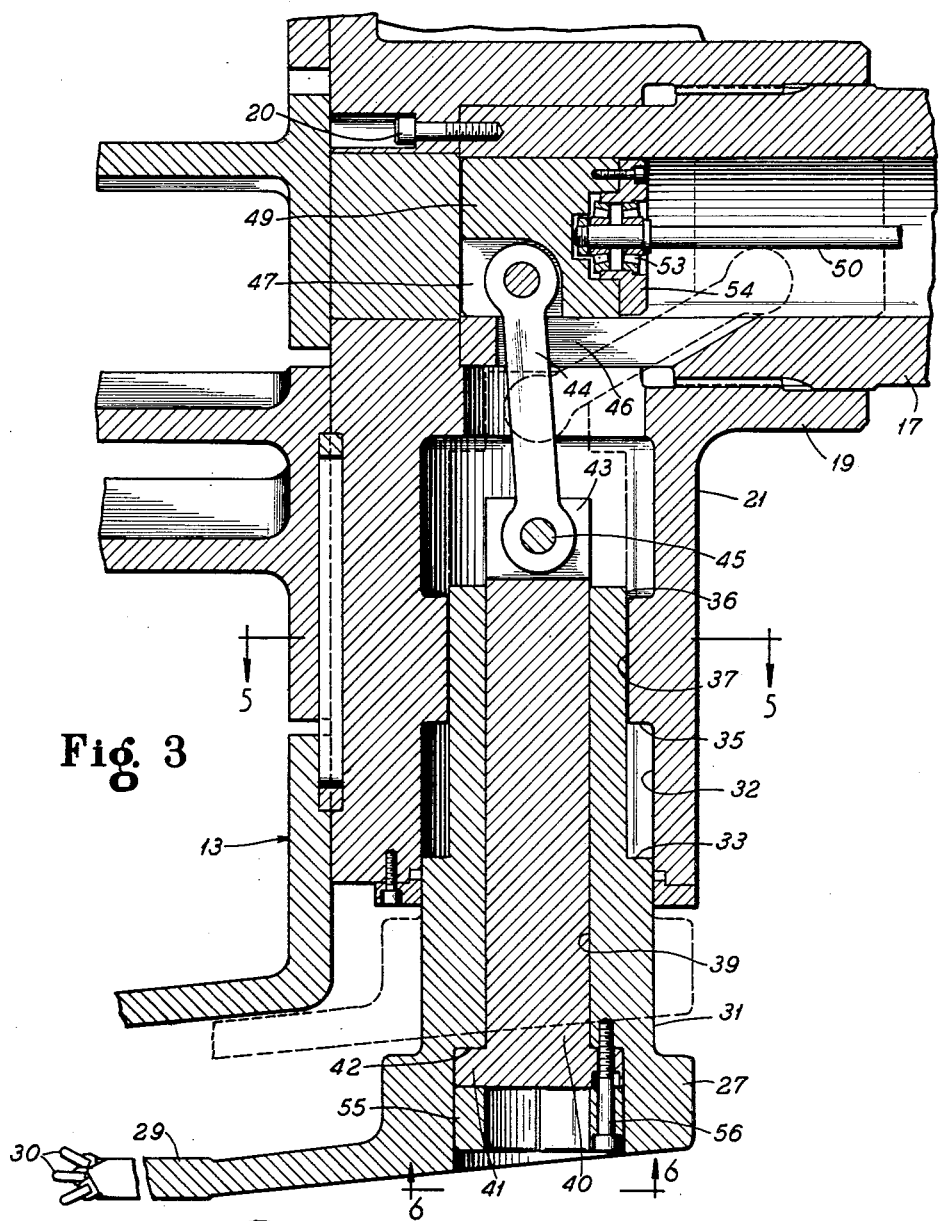
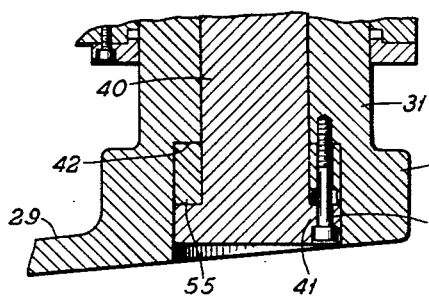
INVENTORS
Vincent A. Dekan
BY Richard C. Lundquist May 22, 1962   R. C. LUNDQUIST ET AL   3,035,822
TELESCOPIC ROTARY BORING HEAD
Filed Nov. 24, 1959   5 Sheets-Sheet 4

INVENTORS
Vincent A. Dekan
Richard C. Lundquist
BY

May 22, 1962  R. C. LUNDQUIST ET AL  3,035,822
TELESCOPIC ROTARY BORING HEAD
Filed Nov. 24, 1959  5 Sheets-Sheet 5

INVENTORS
Vincent A. Dekan
Richard C. Lundquist
BY

United States Patent Office 3,035,822
Patented May 22, 1962

3,035,822
TELESCOPIC ROTARY BORING HEAD
Richard C. Lundquist, Palos Heights, and Vincent A. Dekan, Chicago, Ill., assignors to Goodman Manufacturing Company, Chicago, Ill., a corporation of Illinois
Filed Nov. 24, 1959, Ser. No. 855,063
4 Claims. (Cl. 262—9)

This invention relates to improvements in continuous mining machines of the boring type and more particularly relates to an improved form of boring head for such machines.

An object of the invention is to provide a radially adjustable boring head of the class described having radially spaced kerf cutters and core breaker rollers spaced therebetween, in which the core breaker rollers are circumferentially off-set with respect to each other to increase the range of retractable movement of the telescopic kerf cutter of the boring head, and nest the core breaker rollers in side by side relationship with respect to each other as the adjustable cutter is retracted.

A still further object of the invention is to provide a telescopic boring head of the class described so arranged as to accommodate the adjustable kerf cutter to cut at predetermined fixed cutting diameters.

These and other objects of the invention will appear from time to time as the following specification proceeds and with reference to the accompanying drawings wherein:

FIGURE 3 is a fragmentary sectional view taken substantially along line 3—3 of FIGURE 2, and illustrating the adjustment means for the boring head, with the outer kerf cutter in its fully extended position;

FIGURE 4 is a fragmentary sectional view of the outer adjustable kerf cutter taken in substantially the same plane as FIGURE 3, and showing the outer kerf cutter in a fixed inner position of adjustment;

Figure 1:
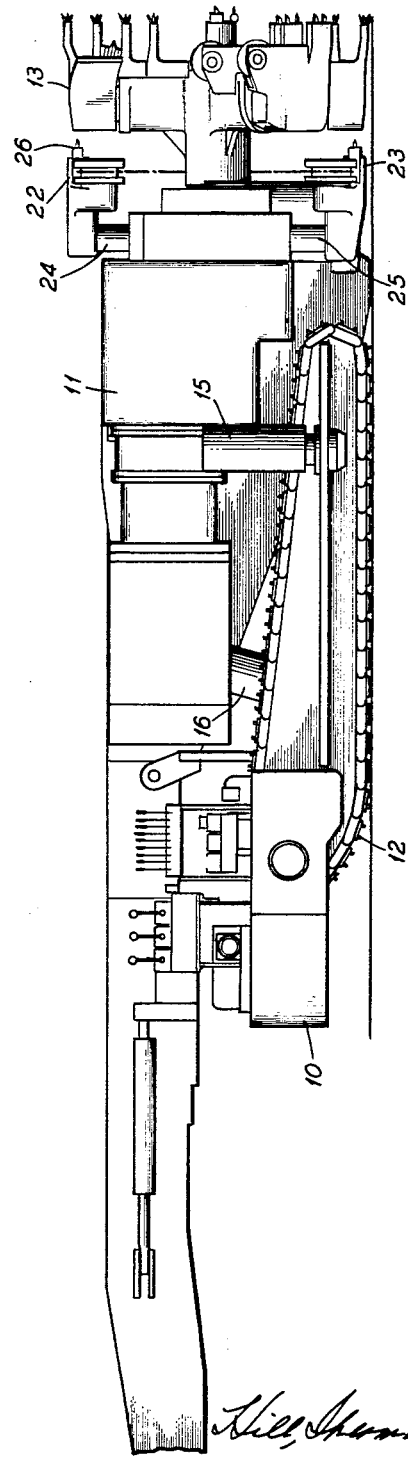
FIGURE 1 is a view in side elevation of a continuous mining machine of the boring type, constructed in accordance with the principles of the present invention.

In the embodiment of the invention illustrated in the drawings, we have shown in FIGURE 1 a continuous mining machine of the boring type having a mobile base or main frame 10 having a cutter frame 11 supported thereon and extending in advance thereof, and mounted on the main frame 10, for vertical adjustment with respect thereto and for angular adjustment about axes extending transversely of said main frame.

The main frame 10 is supported on laterally spaced continuous traction tread devices 12, which serve to transport the machine along the ground from working place to working place and to feed boring heads 13, mounted on and projecting forwardly of the cutter frame 11, to cut contiguous bores in the working face of a mine.

The cutter frame 11 is generally shown in FIGURE 1 as being supported on the main frame 10 on laterally spaced vertically extending hydraulic jacks 15, disposed adjacent the forward end of said main frame and mounted thereon for universal pivotal movement with respect thereto, and on a tilting jack 16 disposed rearwardly of the jacks 15 and having pivotal connection with the main frame 10 and cutter frame 11 in a conventional manner (not shown), for tilting the cutter frame 11 about the bases of the jacks 15 in a manner well known to those skilled in the art, so not herein shown or described further.

The cutter frame 11 has laterally spaced longitudinally extending hollow drive shafts 17 projecting forwardly therefrom, and suitably journalled therein (FIGURE 3). One drive shaft 17 only being shown herein. Each drive shaft 17 forms a support and drive member for a boring head 13.

As shown in FIGURE 3, each boring head 13 has a hub 19 splined to the hollow drive shaft 17 and secured thereto as by cap screws 20 threaded in the annular end portion of said hollow shaft from the outside of said boring head. Each boring head 13 also has three radial boring arms 21, spaced equal distances apart.

Figure 2:
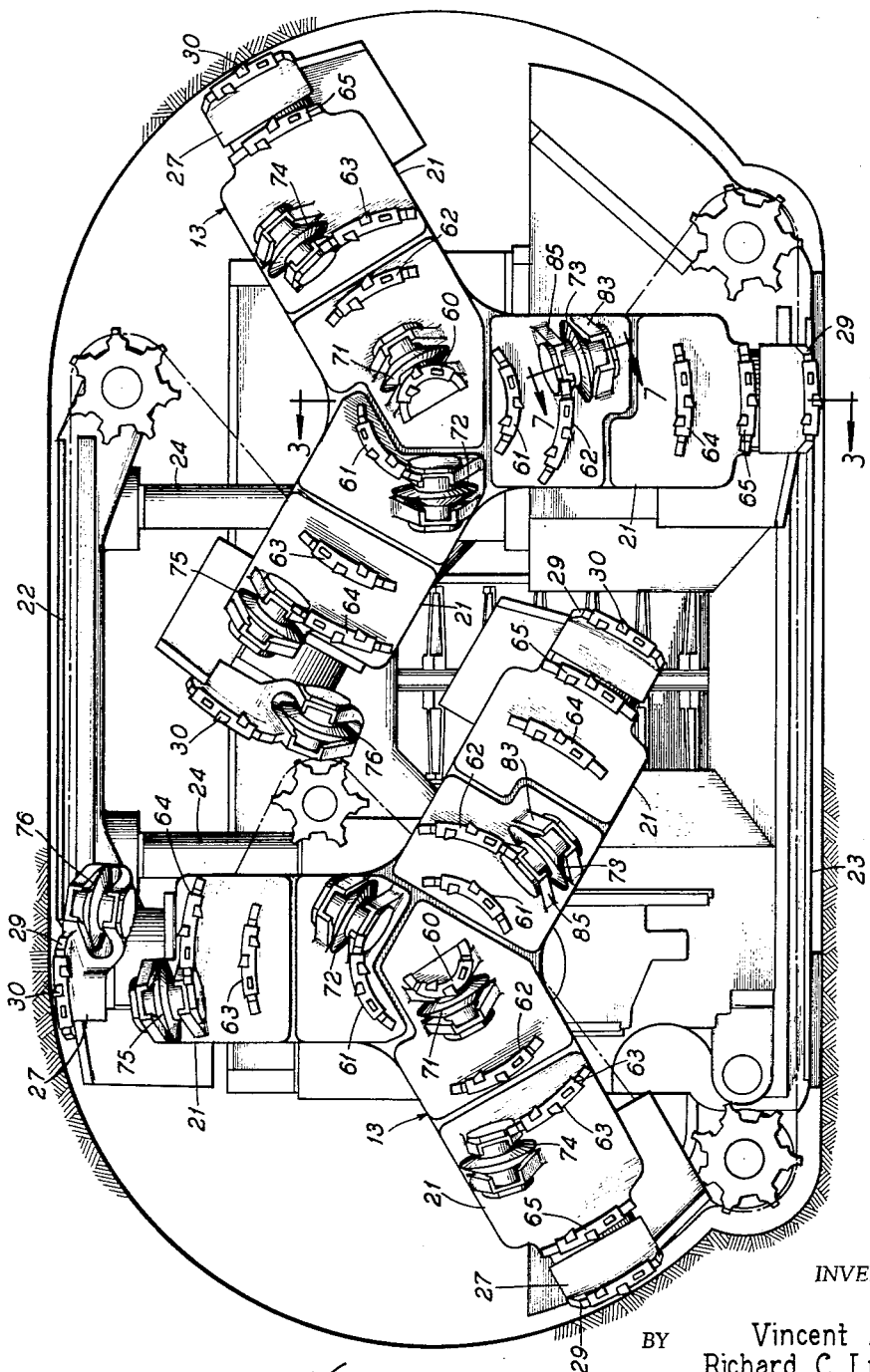
FIGURE 2 is a front end view of the machine shown in FIGURE 1.

The two boring heads 13 are arranged to cut overlapping areas leaving upstanding and depending cusps, cut out by a trimmer chain 26 (FIGURE 1) trained along upper and lower trimmer bars 22 and 23 respectively, the line of travel of which is indicated by dash dot lines in FIGURE 2.

The upper trimmer or cutter bar 22 is mounted rearwardly of the boring heads 13 on laterally spaced hydraulic jacks 24 operable to vertically adjust the trimmer bar 22 to the required cutting height of the machine, and to retain said trimmer bar in a selected adjusted cutting position.

The lower trimmer bar 23 is shown in FIGURE 1 as being adjustably supported on hydraulic jacks 25 depending from the cutter frame 11. The hydraulic jacks 25 having supporting connection with opposite end portions of the lower trimmer bar 23, and serve to vertically adjust said trimmer bar with respect to the cutter frame 11, and to hold said trimmer bar in a selected position of adjustment.

Figure 5:
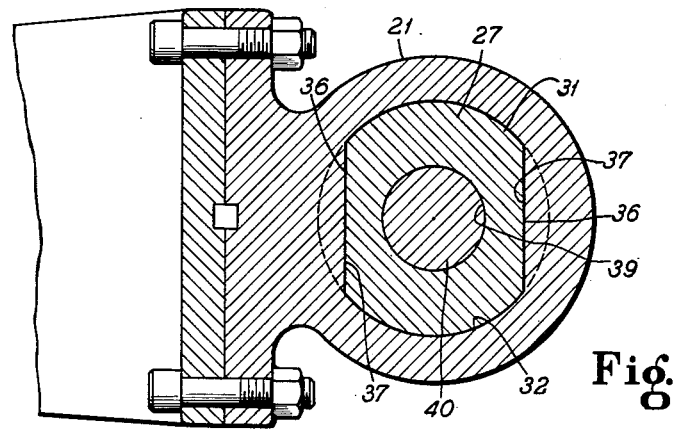
FIGURE 5 is a fragmentary sectional view taken substantially along line 5—5 of FIGURE 3.
Figure 6:
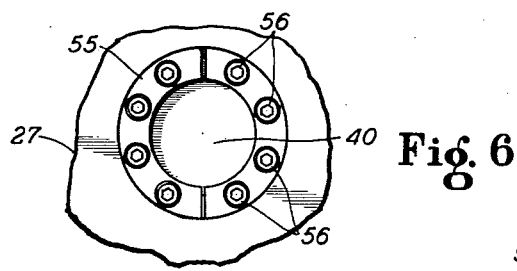
FIGURE 6 is a fragmentary end view of the adjustable kerf cutter looking at the kerf cutter from the outer end thereof and showing the spacer means therefor.

As shown in FIGURES 3 and 5, each boring arm 21 is hollow, the hollow interior portion of which forms a slidable support for a telescopic arm 27. Said telescopic arm 27 has an arcuate cutter support 29 projecting forwardly from the outer end thereof and carrying cutter bits 30, mounted in a cluster to cut an annular kerf in the mine face.

The telescopic arm 27 has a generally cylindrical arm portion 31 extending radially of the axis of rotation of the boring head and telescopically movable within an inner cylindrical wall 32 of the boring arm 21. The cylindrical arm portion 31 has an inner shouldered portion 33, engageable with a shouldered portion 35 extending inwardly of the inner cylindrical wall 32 and limiting inward movement of said telescopic arm. The telescopic arm 27 also has chordal wall portions 36, extending inwardly from the shouldered portion 33 and engaging corresponding wall portions 37 extending radially inwardly from the cylindrical wall portion 32, to retain the telescopic arm 27 from rotation (FIGURE 5).

The telescopic arm 27 has a hollow interior portion 39 through which extends an adjustment shaft or member 40. The adjustment member 40 has a flanged outer end portion 41 recessed within the outer end of the telescopic arm 27 and engageable with a shouldered portion 42 of the hollow interior portion of said telescopic arm 27. The adjustment member 40 also has an inner end portion 43 extending inwardly of the inner end of the cylindrical arm portion 31, which has a link 44 pivotally connected to the inner end thereof on a pivot pin 45. The link 44 is shown as being an umbrella type of link and extends through a slot 46 formed in the hollow drive shaft 17, within a recessed portion 47, formed in a cylindrical slide 49 slidably mounted in the hollow interior portion of the drive shaft 17. A piston rod 50, extensible from a double acting hydraulic cylinder (not shown), like that shown and described in the Patent No. 2,707,626 to Frank Cartlidge entitled "Adjustable Boring Head for Continuous Mining Machine," is provided to adjustably move the slide 49 along the hollow interior portion of the drive shaft 17, and adjust the position of the outer cutter support 29 with respect to the thickness of seam to be bored.

The piston rod 50 is secured to the cylindrical slide 49 on two opposed roller thrust bearings 53 seated in an end cap 54 for the slide 49, to accommodate rotation of the shaft 17 and slide 49 with respect to the piston rod 50 and its cylinder, as shown and described in the aforementioned Cartlidge Patent No. 2,707,626.

While the slide 49, operated by the piston rod 50, retractably moves the telescopic arm 27 into a position to engage the shoulder 33 with the shoulder 35, cutting is usually effected when the link 44 is in the extended position shown in FIGURE 4, retraction of the telescopic arm 27 principally being used to telescope the boring head when the machine is tramming from working place to working place.

A split spacer collar 55 is provided to space the telescopic arm 27 and cutter support 29 in the outwardly extended position shown in FIGURE 3, and in the inwardly extended dotted line position shown in this figure. When the telescopic arm 27 is positioned for cutting at its greatest range of adjustment, the halves of the split spacer collar 55 will abut the outer side of the flanged portion 41 of the adjustment member 40. Machine or cap screws 56 extending through the halves of the split spacer collar 55 and threaded within the telescopic arm 27, are provided to positively retain said arm to the drive or adjustment member 40, in position to cut a maximum diameter annular kerf.

When, however, it is desired to cut a minimum diameter kerf, the cap or machine screws 56 are removed from the telescopic arm 27 and said arm is slidably moved inwardly along the adjustment member 40 until there is sufficient clearance between the inner side of the flange 41 and the outer end of the arm 27 to enable the halves of the split spacer collar 42 to be placed about the adjustment member 40.

The split spacer collar 55 is then brought into engagement with the shoulder 42 and retained thereto by the cap screws 56, extending therethrough from the outer end of the flange 41, and threaded within the telescopic arm 27.

The split spacer collar 45 thus affords a means for setting the telescopic arm 27, cutter support 29 and cutter bits 30 to cut a maximum diameter of kerf, and to assure that the kerf will always be of the same diameter, and to set the telescopic arm 27, cutter support 29 and cutter bits 30 to positively cut at a minimum fixed cutting diameter, as shown in FIGURES 3 and 4.

As shown in FIGURE 2, each boring head 13 has a central cluster of bits 60 supported thereon in advance thereof and conforming to an arc struck from the axis of rotation of said boring head. Each boring head also has two radially outwardly spaced forwardly projecting clusters of cutter bits 61 supported in advance thereof and conforming to an arc struck from the axis of rotation of the boring head; two radially outwardly spaced clusters of bits 62, supported thereon and extending in advance thereof and conforming to an arc struck from the center of the boring head; two radially outwardly spaced clusters of bits 63 extending in advance thereof and conforming to the path of rotation of the boring head; two other outwardly spaced clusters of bits 64 extending in advance thereof and conforming generally to the arc of travel of the boring head; two radially outwardly spaced clusters of bits 65; and the peripheral clusters of bits 30 defining the side walls and top and bottom margins of the working place driven by the miner.

The clusters of bits 60, 61, 62, 63, 64, 65 and 30 on each boring head are mounted at random on the boring arms 21, so that certain clusters of bits precede certain other clusters of cutter bits, to position said clusters of bits to cut seven kerfs, defining seven concentric cores 60a, 61a, 62a, 63a, 64a, 65a and 66a starting from the inner core 60a which is in the form of a circular plug. The radial spacings of the clusters of cutter bits from the center of rotation of the boring head progressively increase from the center of rotation of the boring head to the periphery thereof and leave a series of cores of progressively increasing thickness from the center of the periphery of the boring head.

Associated with a cluster of cutter bits 61 and spaced between the clusters of cutter bits 60 and 61 is a core breaking or splitting roller 71. Associated with a cluster of cutter bits 62 and between the clusters of cutter bits 62 and the clusters of cutter bits 61 is the core breaking or splitting roller 72. In a like manner, a core breaking or splitting roller 73 is disposed between the clusters of cutter bits 62 and 63; a core breaking or splitting roller 74 is disposed between the clusters of cutter bits 63 and 64; a core breaking or splitting roller 75 is disposed between the clusters of cutter bits 64 and 65; and a core breaking or splitting roller 76 is disposed between the clusters of cutter bits 65 and 30.

Figure 8:
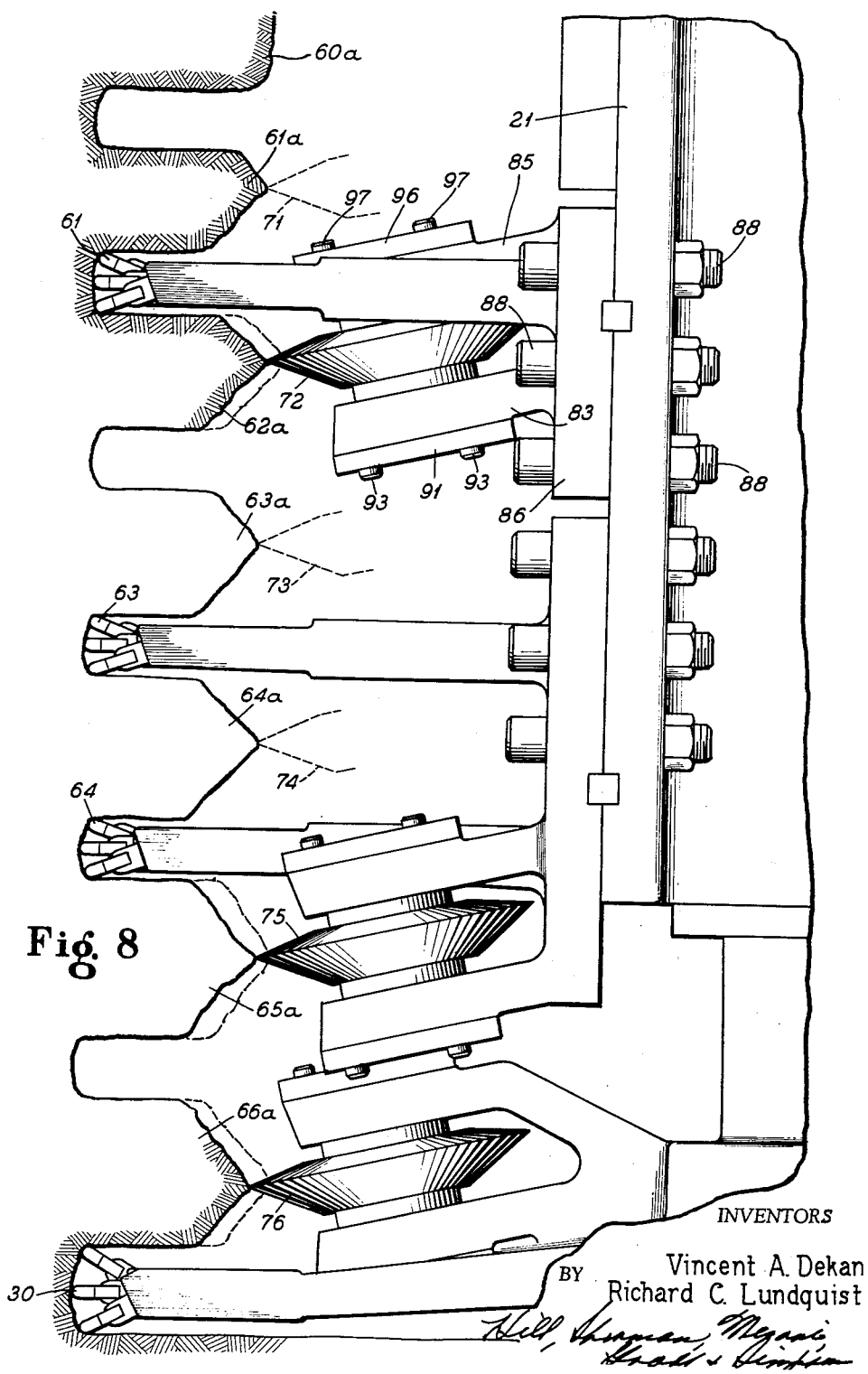
FIGURE 8 is a fragmentary view in side elevation of one of the boring arms in the operation of boring in a mine face, in order to show the cutting and core breaking pattern of the boring head.

As shown in FIGURE 8, the core breaker or splitting roller 71 is engageable with the core 61a and engages the core closer to the inner margin of the core than the outer margin thereof. The reason for positioning the core breaker roller 71 to engage the core 61a closer to the inner than the outer margin of the core, is that the inner portion of the core is primarily in compression, whereas the outer portion of the core is primarily in tension. Minerals generally are much stronger in compression than in tension, making it easier to break the outer than the inner portion of the core. The core breaker or splitting roller 71 is thus located at that point where the thrust effort is used to best advantage.

In a like manner, the core breaker roller 72 engages the core 62a closer to the inner than the outer margins thereof, to exert the greatest force on the portion of the core most difficult to break off. As the cores become thicker and larger in diameter, the breaker rollers engage the cores progressively closer to the centers thereof to split the cores 63a, 64a, 65a and 66a by the associated core breaker rollers 73, 74, 75, and 76 respectively.

The core splitting rollers 71 to 76 inclusive are each of a similar construction and are similar to those shown and described in Patent No. Re. 24,732, the original of which is numbered 2,823,025 and issued to A. R. Biedess on February 11, 1958. Said core splitting rollers each have a wedge shaped cutting periphery 77, interrupted by flutes 79, providing alternately arranged wedge shaped cutting portions 80, off-set from the cutting periphery 77, to make a wandering cut in the face of the core and split the core by a head-on wedging and cutting attack thereon.

Figure 7:
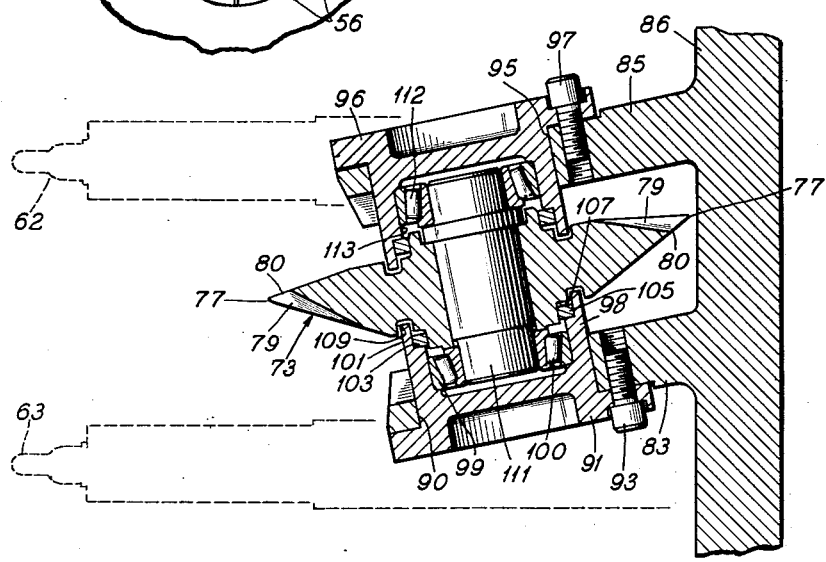
FIGURE 7 is a fragmentary sectional view taken substantially along line 7—7 of FIGURE 2, and illustrating the roller core breaker assembly of the invention.

The mounting means for the core splitting rollers 71 to 76 inclusive on the respective boring arms 21 are similar for each core splitting roller so only one of said mountings need herein be shown or described in detail. In FIGURE 7, we have shown the core splitting roller 73 in section and have shown this roller as being mounted between parallel radially spaced angularly outwardly extending bracket arms 83 and 85 extending forwardly and angularly outwardly from a cutter support 86. The cutter support 86 is secured to an associated boring arm 21 as by nuts and bolts 88 (FIGURE 8). The arm 83 has a cylindrical aperture or bored portion 90 having a flanged cap 91 mounted therein and secured thereto as by cap screws 93 extending through the flange of said cap and threaded in the bracket arm 83 around the bored portion 90. In a like manner, the arm 85 has a cylindrical aperture or bored portion 95 having a cap 96 mounted therein and secured thereto as by cap screws 97. The caps 91 and 96 are of similar construction, so one only need herein be shown and described in detail.

The cap 91 has an annular wall portion 98 extending inwardly therefrom, the inner margins of which forms a seat for an outer race 99 of a thrust bearing 100, herein shown as being a roller thrust bearing. The inwardly extending annular wall portion 97 has an inner portion 101, of reduced cross sectional area, having an annular shoulder 103 at the junction of the wall portions 97 and 101, and forming a seat for an annular seal 105, engaging within a shouldered recessed portion 107 of the outer face of the core splitting roller 73. The reduced diameter wall portion 101 likewise extends within an annular recess or channel 109 in the face of the roller 73, the inner margins of which terminate at the annular shoulder 107, to cooperate with the seal 105 and prevent dust and the like from getting into the bearing 100. The bearing 100 forms a bearing mounting for a shaft 111 forming a support for the roller 73. A thrust bearing 112, mounted on the opposite end of the shaft 111 from the bearing 100 is seated within an annular wall portion 113 of the end cap 96. The core splitting rollers are thus supported on the end caps or cartridges 91 and 96, which may readily be removed from the bracket arms 83 and 85, and may carry the bearing assemblies for the ends of the shaft 111 as well as the sealing means for the bearing assemblies, to seal the bearing assemblies from the entry of dust and the like.

It will be noted in FIGURE 2 that the core splitting rollers 75 are spaced circumferentially of the core splitting rollers 76. This is to accommodate the core splitting rollers 76 to be nested with respect to the core splitting rollers 75 when the telescopic arm 27 is telescopically moved with respect to the arm 21 and to thereby increase the range of telescopic movement of the telescopic arm 27.

It may be seen from the foregoing that we have provided an improved form of boring head, radially adjustable for different cutting diameters, and that adjustment is attained by the use of a simple form of split collar, forming a spacer and placed to one side or the other of the flange of the adjustment member, and spacing the peripheral cutter support outwardly or inwardly with respect to said flange, to cut at fixed maximum or minimum cutting diameters.

It may also be seen that the boring head cuts a plurality of concentric kerfs progressively spaced farther apart toward the periphery of the boring head, leaving cores of progressively increasing thickness from the center to the periphery of the boring head, and thus leaving the thicker cores where they are the easiest to break down, and that the face of each core is attacked by a core splitting roller, the cores most difficult to break down being attacked closer to the inner than the outer margins thereof along the portion thereof subjected to compressive stresses, so as to attack the cores at their strongest places.

While we have herein shown and described one form in which our invention may be embodied, it will be understood that various variations and modifications in the invention may be attained without departing from the spirit and scope of the novel concepts of the invention as defined by the claims appended hereto.

We claim as our invention:

1. In a continuous mining machine, a rotatable boring head having at least one hollow boring arm projecting radially from the axis of rotation thereof, a telescopic arm mounted for telescopic movement with respect to said boring arm and having an arcuate kerf cutter projecting forwardly therefrom for cutting an annular kerf in a mine face, means for telescopically moving said telescopic arm with respect to said boring arm including an adjustment member extending through said telescopic arm and power means for translationally moving said adjustment member and said telescopic arm, said adjustment member having a flanged outer end portion, and spacer means adapted to be interposed between said flanged outer end portion and said telescopic arm for retaining said telescopic arm in fixed relation with respect to said adjustment member and retaining said kerf cutter in a fixed position of adjustment.

2. A continuous boring machine in accordance with claim 1 in which the spacer means comprises a split collar adapted to be clamped to the inner or the outer side of said flange to vary the spacing of said cutter with respect to said boring arm.

3. A continuous mining machine in accordance with claim 1 in which the boring arm has a plurality of radially spaced kerf cutters projecting forwardly therefrom, in which a core breaker roller is mounted radially outwardly of the outermost kerf cutter, wherein said telescopic arm has a kerf cutter projecting forwardly thereupon and has a core breaker roller mounted thereon inwardly of said kerf cutter, and wherein said core breaker rollers are spaced circumferentially with respect to each other, to accommodate nesting of said core breaker rollers and full telescopic movement of said telescopic arm with respect to said boring arm.

4. In a continuous mining machine, a rotatable boring head having at least one hollow boring arm projecting radially from the axis of rotation thereof, a telescopic arm mounted for telescopic movement with respect to said boring arm and having an arcuate kerf cutter projecting forwardly therefrom, a translationally movable power operated adjustment member connected with said telescopic arm and having an abutment engageable with said telescopic arm, and spacer means adapted to be mounted in engagement with the inner or the outer side of said abutment to vary the spacing of said cutter with respect to said boring arm.

References Cited in the file of this patent
UNITED STATES PATENTS

| | | |
|---|---|---|
| 2,734,732 | Tracy | Feb. 14, 1956 |
| 2,766,977 | Robbins | Oct. 16, 1956 |
| 2,811,341 | Robbins | Oct. 29, 1957 |
| 2,872,169 | Robbins et al. | Feb. 3, 1959 |